United States Patent [19]

Yana

[11] Patent Number: 4,720,060
[45] Date of Patent: Jan. 19, 1988

[54] ANTI-RESONANT SUSPENSION DEVICE HAVING SIX DEGREES OF FREEDOM FOR A HELICOPTER

[75] Inventor: Victor Y. Yana, Marseille, France

[73] Assignee: Aerospatiale Societe Nationale Industrielle, France

[21] Appl. No.: 879,217

[22] Filed: Jun. 27, 1986

[30] Foreign Application Priority Data
Jul. 3, 1985 [FR] France .................. 85 10157

[51] Int. Cl.$^4$ ............................................ B64C 27/04
[52] U.S. Cl. .................. 244/17.27; 248/555; 248/559; 416/500; 188/379
[58] Field of Search ............... 244/17.11, 17.25, 17.27; 188/378, 379, 380; 416/500; 248/555, 554, 559

[56] References Cited

U.S. PATENT DOCUMENTS

| | | | |
|---|---|---|---|
| 3,858,831 | 1/1975 | Halwes | 244/17.27 |
| 4,405,101 | 9/1983 | Carlson et al. | 244/17.27 |
| 4,431,148 | 2/1984 | Mouille | 244/17.27 |
| 4,458,862 | 7/1984 | Mouille et al. | 244/17.27 |

Primary Examiner—Joseph F. Peters, Jr.
Assistant Examiner—Rodney Corl
Attorney, Agent, or Firm—McGlew and Tuttle

[57] ABSTRACT

The device comprises four identical assemblies evenly spaced apart about the vertical axis of a speed reducer (1), offset 90° from each other and each comprising an isotropic flexible beam (4) carrying a beating weight (14) and connected by its ends to the fuselage, this beam being perpendicular to the vertical axis, and rigid triangulation means (9, 10) connecting the speed reducer (1) to the beam (4) so as transmit its forces and its moments to the beam in a plane parallel to an offset from said vertical axis of the speed reducer (1).

7 Claims, 4 Drawing Figures

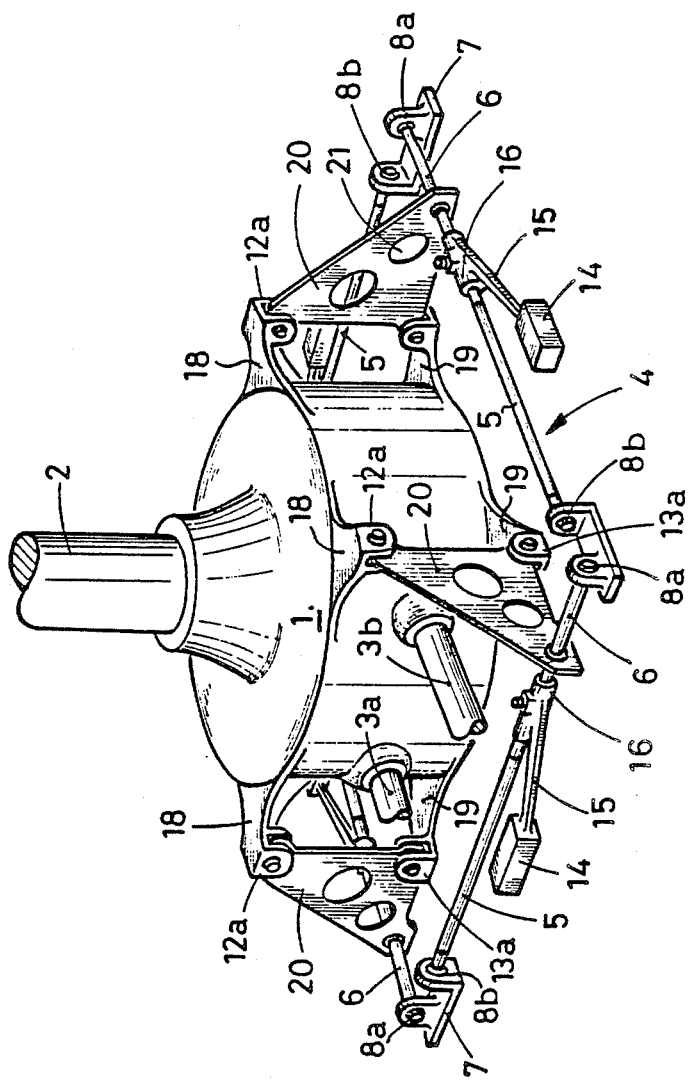

ANTI-RESONANT SUSPENSION DEVICE HAVING SIX DEGREES OF FREEDOM FOR A HELICOPTER

The present invention relates to a multi-directional anti-resonant suspension device for an assembly consisting of a speed reducing transmission box and a lift rotor for a helicopter.

In a helicopter comprising a fuselage and an motor unit, the driving force coming from the latter is received by a transmission box which forms a speed reducer having a vertical output shaft carrying the rotor and which may be connected to the fuselage by an elastically yieldable connecting device adapted to absorb the vibrations transmitted to the speed reducer by the rotor in service.

Many devices are known for filtering these vibrations between the rotor and the speed reducer in the assembly.

U.S. Pat. No. A-4,372,431 discloses an insolator of vibrations about six axes comprising four inertia weights spaced 90° apart in the plane of the pitch and roll axes and mounted resiliently between the support of the transmission of a helicopter and the fuselage of the latter by means of a support arm whose section is variable for adjusting its stiffness.

The U.S. Pat. No. 4,431,148 of the applicant concerns a device in which the speed reducer is secured by its lower part to a diaphragm which is flexible in bending, is itself secured to the fuselage of the helicopter, and comprises a plurality of oblique support bars whose upper ends are articulated in the vicinity of the top of the speed reducer and whose lower ends are connected to the outer ends of flexible triangulation arms disposed radially about the lower part of the speed reducer. These flexible arms are connected, on one hand, to the fuselage by their outer end and, on the other hand, to the lower part of the speed reducer by their inner end.

Each flexible triangulation arm has in its length a flexible portion and a rigid portion carrying a lever at the end of which a beating weight is fixed.

The flexibly bending diaphragm connects the lower part of the speed reducer to the fuselage so as to transmit from one to the other the reaction of the rotor driving torque while allowing movements of oscillation and vertical translation of the speed reducer with respect to the fuselage.

Although these anti-resonant suspension devices have shown themselves to be particularly effective, it has been found that they could be still further improved, and the object of the invention is to provide a device of this type which is of simpler construction, has six degrees of freedom, enables all the excitations coming from the rotor to be filtered and has a single adjustment point which is that of the pumping force, i.e. along the vertical axis of the rotor.

The invention therefore provides an anti-resonant suspension device for mounting the lift rotor-speed reducer assembly on the fuselage of a helicopter of the type in which the speed reducer is fixed to the fuselage by four identical assemblies of triangulation means and suspension arms evenly spaced apart about the vertical axis of the speed reducer and offset 90° from each other, each suspension arm having in its length an isotropic flexible portion and a rigid portion to which is connected a lever including a beating weight, wherein:

each assembly of triangulation means connecting the speed reducer to each suspension arm is constituted by two bars which are contained in a plane parallel to the vertical axis of the speed reducer and offset with respect to the latter, and which define a right triangle whose hypotenuse extends from said suspension arm to the upper part of the speed reducer, one side of the right angle extending from said arm to the lower part of the speed reducer, the ends of said triangulation bars are connected to said speed reducer by articulations allowing an angular movement of each assembly of triangulation bars about the axis parallel to the vertical axis of the speed reducer defined by the two points of articulation of said bars on the fuselage, the connection of each assembly of two triangulation bars to the corresponding flexible arm is achieved by ball and socket articulations allowing an angular movement of said connection in any direction about the centre of rotation so as to transmit to the flexible arm solely forces parallel to the plane defined by each assembly of triangulation bars.

The following description with reference to the accompanying drawings given by way of non-limiting examples will explain how the invention can be put into practice.

In the drawings:

FIG. 3 is a similar view of a third embodiment, and

Figure 1:
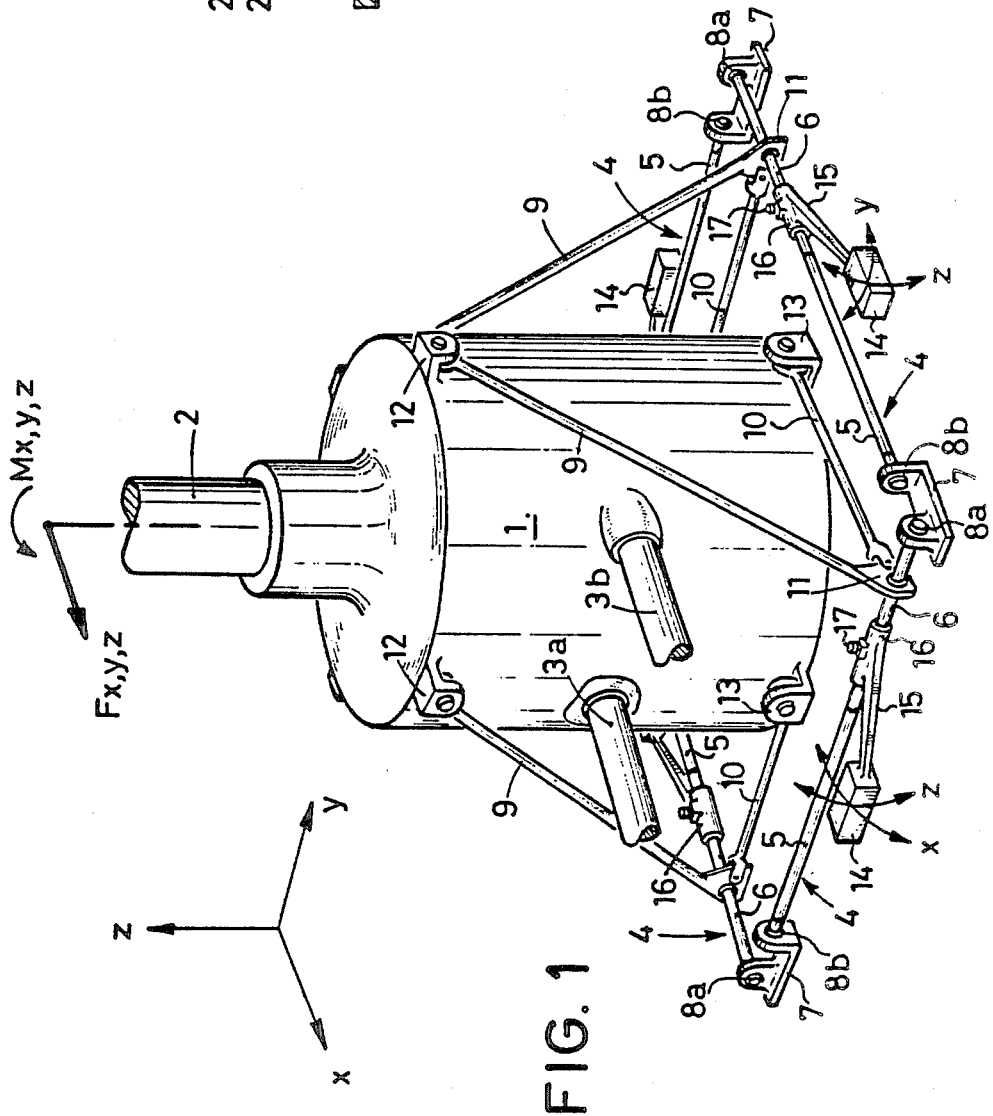
FIG. 1 is a perspective view of a first embodiment of the suspension device according to the invention.

With reference to FIG. 1, there is shown the transmission box 1 forming a speed reducer for driving a lift rotor (not shown) carried by the vertical output shaft 2 of the speed reducer.

The driving force is transmitted to this speed reducer 1 through one or two transmission shafts 3a, 3b connected to a motor unit (not shown).

The suspension device according to the invention comprises, as represented, four identical assemblies evenly spaced apart around the vertical axis of the speed reducer 1 and offset 90° from each other. Each of these assemblies comprises an isotropic flexible beam generally designated by the reference 4, having a flexible portion 5 of an evolutive circular section so that the bending stresses applied to this beam are substantially constant throughout the length of this portion, and a relatively rigid portion 6 of circular section.

Figure 4:
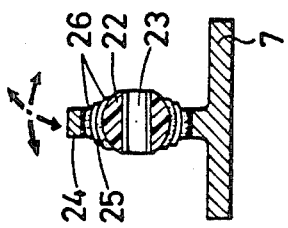
FIG. 4 is a sectional view of a laminated spherical bearing mounting ends of a flexible beam on the fuselage of the helicopter, this bearing being also used for other articulations of the device according to the invention.

The beam 4 is connected to strong points of the fuselage (not shown) of the helicopter by brackets 7 through spherical laminated bearings 8a, 8b of the type shown in FIG. 4, the end of the rigid portion 6 being fixed in the bearing 8a while the end of the flexible portion 5 is longitudinally slidable in the bearing 8b.

Each beam 4 is spaced away from the speed reducer 1 and perpendicular to the vertical axis of the latter.

The speed reducer 1 is connected to each beam 4 by rigid triangulation means which are adapted to transmit the forces and the moments of the speed reducer and are, according to the embodiment shown in FIG. 1, constituted by two bars 9, 10 respectively forming the hypotenuse and one side of the right angle of a right triangle contained in a plane parallel to the vertical axis of the speed reducer and laterally offset with respect to this axis.

The bar 9 has at its lower end a portion 11 forming a yoke in which is disposed a laminated spherical bearing such as that shown in FIG. 4 and through which extends the rigid portion 6 of the beam 4. The opposite end of the bar 9, forming the hypotenuse of the triangle, is articulated, by means of an identical bearing, in a yoke 12 provided in the upper part of the body of the speed reducer.

The bar 10 extends in a direction perpendicular to the beam 4 and is secured by one of its ends, constituting a yoke, to the portion 11 of the bar 9, while its opposite end is articulated to the speed reducer by means of a yoke 13 provided in the lower part of the body of the speed reducer, vertically below the yoke 12, by means of a laminated spherical bearing, a straight line parallel to the vertical axis of the speed reducer and joining the yokes 12 and 13 forming the second side of the right angle of the right triangle defined by the bars 9, 10.

On the relatively rigid portion 6 of each beam 4 is mounted a beating weight 14 fixed to one end of a rigid arm 15 rigid with a sleeve 16 from which it extends obliquely, the sleeve 16 being slidably mounted on the rigid portion 6 between the end portion 11 of the bar 9 and the flexible portion 5, it being thus possible to adjust the position of the sleeve and to fix it, for example by a set screw 17 or other suitable means, the arrangement being such that the arm 15 offsets the beating weight 14 from the flexible portion 5 of the beam 4.

This beating weight 14 may thus undergo, under the effect of various forces exerted by each pair of bars on the flexible beam 4, an angular movement in any direction about a centre of rotation constituted by the end of the rigid portion 6 of the beam which is held stationary in the bearing 8a.

The assembly constituted by the beating weight 14 and the flexible portion 5 of the beam thus performs the function of a resonator for filtering the excitatios coming from the head of the rotor and transmitted through each pair of bars 9, 10, irrespective of the direction of these excitations in the plane defined by each pair of bars.

Figure 2:
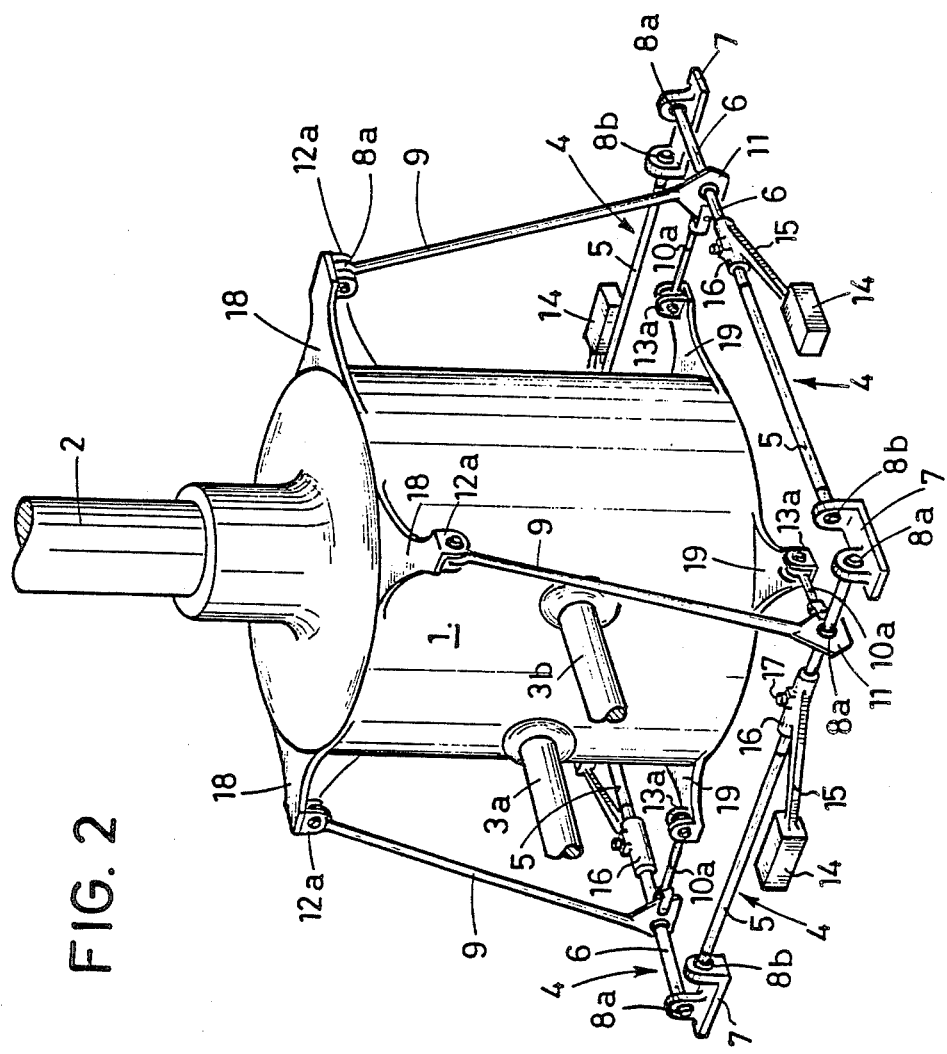
FIG. 2 is a view similar to FIG. 1 of a second embodiment of the invention.

FIG. 2 shows a first modification of the device described hereinbefore with reference to FIG. 1. In this embodiment, the upper yoke 12a and the lower yoke 13a to which each oblique bar 9 and each horizontal bar 10a are respectively articulated, are still rigid with the body of the speed reducer and are still disposed on a straight line parallel to the axis of the rotor but, in contrast to the embodiment of FIG. 1, these yokes 12a, 13a are fixed to the end of rigid arms 18, 19 respectively, which space them away from the body of the speed reducer. As a result, there is a shortening of the lower bar 10a and a less inclined position of the oblique bar 9. This arrangement of the bars 9, 10a is advantageous in that it provides an improved clearance of the periphery of the speed reducer and permits an easier installation of the associated elements and, in particular, the parallel input shafts 3a, 3b of the speed reducer, in the case of a bi-motor helicopter.

FIG. 3 shows another embodiment of the device according to the invention in which the oblique bar 9 constituting the hypotenuse of the right triangle and the horizontal bar 10a of the embodiment of FIG. 2 are replaced by a rigid plate 20 having the shape of a right triangle each corner of which is provided with a laminated spherical bearing and which is so disposed that the apex of the right angle corresponds to the lower yoke 13a fixed to the end of the arm 19 of the speed reducer, while the end of the second side of the right angle is connected to the yoke 12a at the end of the arm 18 of the speed reducer.

This triangular plate 20 is rigid in its plane and transmits the forces and the moments of the body of the speed reducer to the flexible beam 4. This plate 20 may optionally have lightening apertures 21 in its central part and reinforcements (not shown) on the edges which correspond to the sides of the triangle.

This arrangement is particularly suitable for short speed reducers and in particular those of the type having a cylindrical output speed reducer stage instead of conventional epicyclic stages.

FIG. 4 is a sectional view of a laminated bearing of a known type which is particularly adapted for use in the device according to the invention.

The bearing comprises a ball 22 provided with a diametrical aperture 23 and enclosed in a yoke 24 in which it is maintained by an alternating superimposition of spherical annular elements 25 of a suitable elastomer material and spherical metal domes 26 to which these elements 25 are adhered.

The dynamics of the suspension device according to the invention is the following:

(a) under the effect of either of the excitations acting at Fx and My on the head of the rotor, the speed reducer undergoes a pitch movement and a longitudinal sway with respect to the fuselage;

(b) under either of the two excitations acting at Fy and Mx on the head of the rotor, the speed reducer is subjected to a roll movement and lateral sway with respect to the fuselage;

(c) under the excitation acting at Fz on the head of the rotor, the speed reducer is subjected to a pumping moment with respect to the fuselage;

(d) under the excitation acting at Mz on the head of the rotor, the speed reducer is subjected to a yaw movement with respect to the fuselage.

Owing to the suspension device according to the invention, the speed reducer has six degrees of freedom with respect to the fuselage and its kinematics is the following:

(1) the vertical pumping of the speed reducer vertically stresses the four flexible beams 4 and the four beating weights 14;

(2) the roll of the speed reducer vertically stresses the four flexible beam 4 and the four beating weights 14;

(3) the pitch of the speed reducer vertically stresses the four flexible beams 4 and the four beating weights 14;

(4) the longitudinal sway movement of the speed reducer horizontally stresses the two flexible beams 4 which are perpendicular to the longitudinal axis and the two weights 14 mounted on these two beams;

(5) the lateral sway movement of the speed reducer horizontally stresses the two flexible beams 4 which are perpendicular to the lateral axis and the two weights 14 mounted on these two beams;

(6) the yaw movement of the speed reducer (taken from the reaction of the dynamic and static driving torque) horizontally stresses the four flexible beams and the four beating weights 14.

It will be understood that in the device according to the invention, the means for transmitting to the flexible beams the forces and the moments of the speed reducer are articulated to the latter at points located at the ends of two orthogonal diameters of the speed reducer and extend substantially in a direction perpendicular to these diameters and to the beams and consequently are under compressive or tensile stress in their own plane tangentially to the body of the speed reducer.

The dynamic regulation of the assembly of the suspension is achieved solely in the vertical direction, i.e. in pumping. This regulation through a single point is made possible by the fact that the four resonators each constituted by the flexible portion 5 of the flexible beam 4 and the beating weight 14 have the same operation irrespective of the radial direction of the excitation exerted thereon. Indeed, the flexible portion 5 has a circular section and is therefore isotropic and the beating weight can oscillate angularly within a cone whose apex is the centre of the spherical bearing 8a. Consequently, the six possible movements of the speed reducer with respect to the fuselage resulting in vertical or horizontal excitations of the four resonators, are filtered in an equivalent manner irrespective of the direction of the excitation.

As the pumping operation is therefore representative of the general principle of operation of the resonators and of the pumping excitation and the measure of the corresponding filtering is simple to realize in a laboratory and a workshop, it is consequently the pumping regulation which is chosen for regulating the suspension as a whole.

The flexible beams 4 are preferably made from a composite material of high-strength unidirectional fibres, for example glass or Kelvar fibres bonded by a thermosetting synthetic resin. These beams may also be made from metal, for example from titanium.

The flexible portion 5 of each flexible beam 4 has a circular section of an evolutive profile so that the bending stresses are constant throughout the length of this portion.

It will be observed that the device according to the invention permits the elimination of the diaphragm employed in the aforementioned patent of the Applicant and in other devices and on which the speed reducer is fixed, so that it is possible to simplify manufacture and lighten the floor which constitutes the upper structure of the fuselage of the rotor aircraft.

What is claimed is:

1. An anti-resonant suspension device of a lift rotor speed reducer assembly for a fuselage of a helicopter, comprising: pivot members at four locations equally spaced about the rotor speed reducer assembly; a triangular member having an apex pivotally connected to each one of said pivot members, each said triangular member having a base portion with a first base pivot and a second base pivot, each of said second base pivots connected to a base portion of the rotor speed reducer assembly; a first suspension arm suspended between a first bearing and a second bearing; a second suspension arm suspended between said second bearing and a third bearing; a third suspension arm suspended between said third bearing and a fourth bearing; a fourth suspension arm suspended between said first bearing and said fourth bearing, each of said first, second, third and fourth bearings having a base portion connected to the fuselage, each of said suspension arms having an isotropic flexible portion and a rigid portion; a support lever including a beating weight connected to each rigid portion of each suspension arm, each first base pivot of each of said triangular members being connected to a suspension arm.

2. An anti-resonant suspension device according to claim 1, wherein: each of said triangular members includes a first and second bar contained in a plane parallel to a vertical axis of the rotor speed reducer assembly, the first bar extending from one of said pivot members to one of said suspension arms and the second bar extending from said suspension arm to the base portion of the rotor speed reducer assembly, a connection formed between each of first bars of said triangular member and the corresponding suspension bar including ball articulations allowing an angular movement of the connection in any direction about the center of rotation so as to transmit to the flexible arm only forces which are parallel to a plane defined by each of the triangular members.

3. An anti-resonant suspension device according to claim 1 wherein: each of said triangular members includes a rigid plate lying in a plane parallel to a vertical axis of the rotor speed reducer assembly, said rigid plate having the shape of a right triangle having a hypotenuse extending from said suspension arm to an upper part of the speed reducer, one side of the right angle of the triangle extending from a suspension arm to the base portion of the rotor speed reducer assembly, a connection between the triangular plate and the corresponding flexible arm including a ball articulation allowing for an angular movement of the connection in any direction about a center of rotation of the ball articulation so as to transmit to the suspension arm only forces parallel to a plane defined by each triangular plate.

4. An anti-resonant suspension device according to claim 3 wherein: said ball articulations include laminated spherical bearings.

5. An anti-resonant suspension device according to claim 2 wherein: said ball articulations include laminated spherical bearings.

6. An anti-resonant suspension device according to claim 2 wherein: said support lever extends obliquely from the rigid portion of each suspension arm and is adjustable along the length of each rigid portion of each suspension arm.

7. An anti-resonant suspension device according to claim 3 wherein: said support lever extends obliquely from the rigid portion of each suspension arm and is adjustable along the length of each rigid portion of each suspension arm.

* * * * *